United States Patent [19]
Tal et al.

[11] Patent Number: 5,341,054
[45] Date of Patent: Aug. 23, 1994

[54] LOW MASS ELECTROMAGNETIC ACTUATOR

[75] Inventors: Zeev Tal, Beverly Hills; Keith O. Stuart, Cypress; Dennis C. Bulgatz, Reseda, all of Calif.

[73] Assignee: Aura Systems, Inc., El Segundo, Calif.

[21] Appl. No.: 961,102

[22] Filed: Oct. 14, 1992

Related U.S. Application Data

[63] Continuation-in-part of Ser. No. 855,771, Mar. 23, 1992, which is a continuation-in-part of Ser. No. 499,046, Mar. 26, 1990, Pat. No. 5,099,158, which is a continuation-in-part of Ser. No. 319,956, Mar. 7, 1989, Pat. No. 4,912,343, which is a continuation-in-part of Ser. No. 238,925, Aug. 31, 1988, abandoned.

[51] Int. Cl.⁵ .............................................. H02K 41/00
[52] U.S. Cl. ............................................ 310/14; 310/12
[58] Field of Search .................................. 310/12, 13, 14

[56] References Cited

U.S. PATENT DOCUMENTS

| | | | |
|---|---|---|---|
| 4,827,163 | 5/1989 | Bhate et al. | 310/15 |
| 4,912,343 | 3/1990 | Stuart | 310/14 |
| 5,099,158 | 3/1992 | Stuart et al. | 310/14 |
| 5,142,172 | 8/1992 | Horikoshi et al. | 310/13 |
| 5,187,398 | 2/1993 | Stuart et al. | 310/14 |

FOREIGN PATENT DOCUMENTS

| | | | |
|---|---|---|---|
| 1200364 | 12/1985 | U.S.S.R. | 310/15 |

*Primary Examiner*—Steven L. Stephan
*Assistant Examiner*—Judson H. Jones
*Attorney, Agent, or Firm*—Anthony T. Cascio; Lisa A. Clifford

[57] ABSTRACT

An electromagnetic actuator includes a magnetic flux conductive material housing, an electrical current conductive coil, a magnetic flux conductive material stationary core portion, a slideable core portion, and a pair of radially polarized magnetic flux developing elements. The coil is disposed in the housing coextensively adjacent to the housing's interior wall. The core is disposed within the housing and the coil and includes both the magnetic flux conductive stationary core portion and the slideable core portion. The slideable core portion is slideably received on the stationary core portion, and the magnetic flux developing elements are carried on the exterior wall of the slideable core portion in a facing relationship with the coil.

20 Claims, 3 Drawing Sheets

／5,341,054

LOW MASS ELECTROMAGNETIC ACTUATOR

RELATED APPLICATION DATA

The present application is a continuation-in-part of co-pending U.S. patent application No. 07/855,771 filed Mar. 23, 1992, which is a continuation in part of co-pending U.S. patent application No. 07/499,046, filed Mar. 26, 1990, now U.S. Pat. No. 5,099,158, issued Mar. 24, 1992 (the "'158 Patent"); which in turn is a continuation in part of U.S. patent application No. 07/319,956, filed Mar. 7, 1989, now U.S. Pat. No. 4,912,343, issued Mar. 27, 1990 (the "'343 Patent"); which in turn is a continuation in part of U.S. patent application No. 07/238,925, filed Aug. 31, 1988, now abandoned; each of which has been assigned to the assignee of the invention described in the present application and which are incorporated herein by reference.

FIELD OF THE INVENTION

The present invention relates generally to electromagnetic actuators, and more particularly to an improved electromagnetic actuator that is capable of providing relatively large output forces in response to relatively small input signals, and is also capable of achieving a longer stroke at higher frequency by reducing the moving core mass.

BACKGROUND OF THE INVENTION

Electromagnetic actuators are well known. In many applications, the output force of the actuator is controlled by and is a function of an electrical control or command signal, and as such can be used in a variety of applications. One type of electromagnetic actuator is the "linear" actuator wherein output force is linearly proportional to the input electrical current.

One type of linear actuator is shown in Prior Art FIG. 1. More particularly, FIG. 1 shows a prior art actuator 10 which is commercially available from Northern Magnetics of Van Nuys, Calif. The prior art actuator 10 includes magnetic flux conductive cylindrical case 12 having an inner wall 14 extending between a first end 16 and second end 18 of the case 12. An electrical current conductive coil 20 is wound on a nonmagnetic material coil carrier 21. The carrier 21 is coaxially secured within the case 12 with the windings of the coil 20 being intermediate the carrier 21 and the inner wall 14. The windings are made from thin copper wire. A core assembly 19 includes an axially polarized cylindrical magnet 22, a first and a second pole piece 28, 30, and a cylindrical rod 32. The axially polarized cylindrical magnet 22 has a first magnetic pole at its first end 24 and a second opposite magnetic pole at its second end 26. The first disc shaped magnetic flux conductive material pole piece 28 is attached to the first end 24 of the permanent magnet 22. The second magnetic flux conductive material pole piece 30 is connected to the second end 26 of the permanent magnet 22.

The permanent magnet 22 and the first and second pole pieces 28, 30 are coaxially mounted to the cylindrical rod 32 which, in turn, is coaxially received by end caps 34, 36 in axial slideable engagement. Each end cap 34, 36 is attached to the cylindrical case 12. The rod 32 is received in slideable engagement in coaxial bores 38, 40 in each respective end cap 34, 36. The cylindrical rod 32 and end caps 34, 36 are of nonmagnetic material. The actuator 10 is one type of moving core actuator wherein the entire core assembly 19, including the magnet 22, pole pieces 28, 30, and rod 32, moves in order to perform the desired function of the actuator. As a result the moving mass of the core assembly 19 is relatively heavy.

The first pole piece 28 provides flux in a radial first direction across the coil 20 and the second pole piece 30 provides flux in the opposite radial direction across the coil 20. Ideally, the flux is confined to the case 12 in the axial section between the present position of the first pole piece 28 and the second pole piece 30. Thus, if current is put into the coil 20 at its midpoint 42, with the current return being at a first end 44 and a second end 46, with each end 44, 46 connected in common, then the current flux cross product with each pole piece 28, 30 will be additive. Alternatively, the coil 20 of the prior art actuator 10 may also be counterwound at either side of the midpoint 42 as set forth in the '158 Patent.

One problem with the prior art actuator is that ideal flux utilization does not exist. Since the magnet 22 is axially polarized, there will be leakage of the flux from the first pole piece 28 to the second pole piece 30 at the point they are attached to the rod 32 through the center bore of the rod 32. Accordingly, not all the available flux from the magnet 22 is being utilized to provide radial flux in confined axial regions of the coil 20. This flux loss reduces the total output power available from the actuator 10.

Furthermore, the hard magnetic material used in the prior art actuator limits the flux density through the actuator core. The magnetic material used in the prior art actuator carries a maximum flux density of 1.3 Tesla. In comparison, the actuator of the present invention utilizes cobalt iron or iron, which carries a maximum flux density of 2.4 Tesla. Therefore, for a given volume, the actuator of the present invention carries approximately 84% more flux density than the prior art actuator. Accordingly, the actuator of the present invention provides more force than the prior art actuator with the same amount of energy consumption.

Another limitation on the total output force available from the prior art actuator 10 is due to the coil carrier 21 being disposed between the pole pieces 28, 30 and the coil 20. The nonmagnetic material carrier 21 enlarges the gap in which the flux is confined, thereby reducing field strength.

A limitation on the dynamic output force capability of the prior art actuator is that the entire core assembly, including the magnet, pole pieces and rod, must be accelerated in order for the actuator to perform its function. As a result, a substantial portion of the actuator's energy is used to move the core assembly's relatively heavy weight. For a fixed force, the stroke of the actuator is inversely proportional to the actuator's moving mass. Therefore, for a fixed maximum force, the actuator's stroke and frequency capabilities are limited.

SUMMARY OF THE INVENTION

Accordingly, it is a primary object of the present invention to overcome one or more disadvantages and limitations of the actuator identified in prior art FIG. 1. A significant object of the present invention is to provide a linear actuator that is capable of achieving a longer stroke at higher frequency than the prior art by reducing the moving core mass.

According to a broad aspect of the present invention, an electromagnetic actuator includes a magnetic flux conductive material housing, an electrical current conductive coil, a magnetic flux conductive material core, and at least one magnetic flux developing element. The housing has a first housing end, a second housing end, and an interior wall extending between the first housing end and the second housing end. The interior wall defines a chamber within the housing. The coil is disposed in the chamber coextensively adjacent and connected to the interior wall. The core comprises a stationary core portion and a slideable core portion. The slideable core portion has a first core end, a second core end, an exterior wall and an interior wall extending between the first core end and the second core end. The stationary core portion defines a stationary core exterior wall. The stationary core exterior wall and the slideable core interior wall are in a facing relationship with respect to each other. The stationary core portion and slideable core portion are received within the chamber with motion of the slideable core portion traversing the stationary core portion in an axial direction. The coil and the exterior wall are in a facing relationship with respect to each other.

A feature of the present invention is that the combination of a stationary core portion and slideable core portion allows the actuator to provide a longer stroke at higher frequency than the prior art by reducing the moving core mass.

A feature of the present invention is that the magnetic flux developed by the magnetic elements can pass through the stationary core portion.

A feature of the present invention is that the actuator requires less energy than the prior art to provide high frequency and high amplitude motion.

These and other objects, advantages and features of the present invention will become readily apparent to those skilled in the art from a study of the following description of an exemplary preferred embodiment when read in conjunction with the attached drawing and appended claims.

DESCRIPTION OF AN EXEMPLARY
PREFERRED EMBODIMENT

Figure 1:
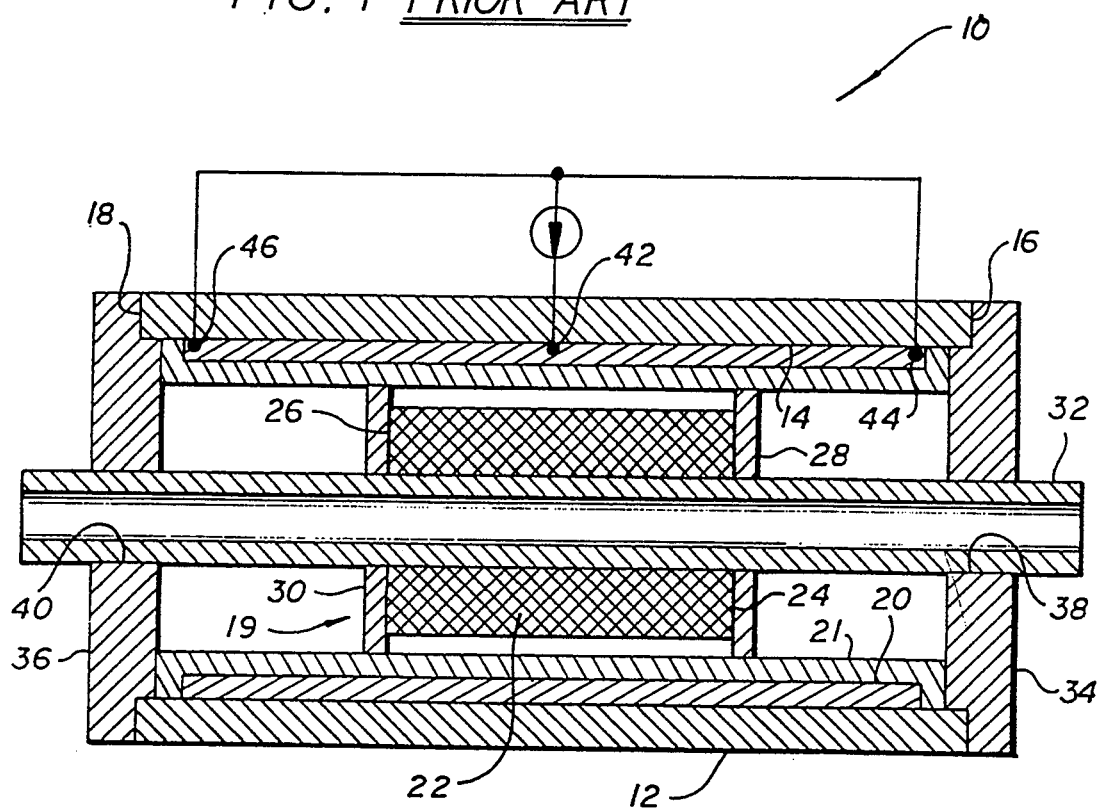
FIG. 1 (Prior Art) is a cross sectional view of the commercially available electromagnetic actuator used to illustrate the current state of the prior art.
Figure 2:
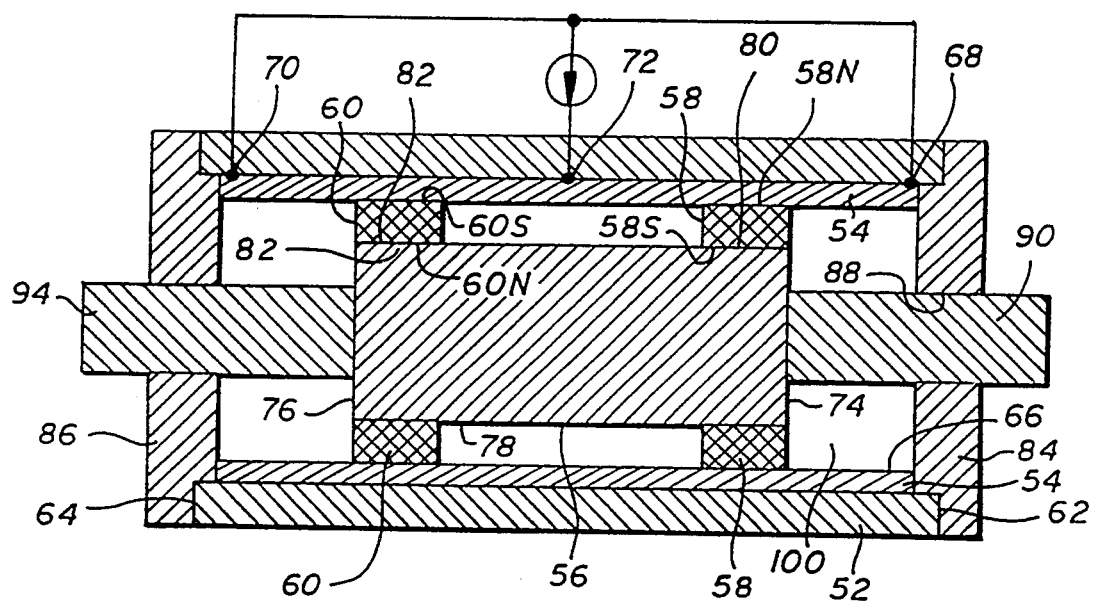
FIG. 2 is a cross sectional view of the electromagnetic actuator constructed according to the principles of the present invention.

Referring now to FIG. 2, there is shown a linear electromagnetic actuator 50 constructed according to the principles of the present invention. The actuator 50 includes a housing 52, an electrical current conductive coil 54, a core 56, and a first and a second magnetic flux developing element 58, 60. Although each of the above-mentioned elements of the actuator 50 will be described hereinbelow as being cylindrical in construction and coaxially disposed with respect to each other, it is to be understood that other geometries which satisfy the cooperation between the elements are within the scope of the present invention.

The housing 52 is an elongated cylinder fabricated from magnetic flux conductive material. The housing 52 has a first housing end 62, a second housing end 64, and an interior wall 66 extending axially between the first housing end 62 and the second housing end 64. The housing 52 may further include a plurality of fins 98 (shown in FIG. 4) extending around the circumference of the housing 52 for cooling purposes. Alternatively, the cooling fins may extend axially along the length of the housing 52. The interior wall 66 defines a chamber 100 within the cylindrical housing 52.

The coil 54 is disposed in the chamber 100 coextensively adjacent to the interior wall 66. The coil 54 has a first coil end 68 disposed proximate the first housing end 62 and a second coil end 70 disposed proximate the second housing end 64. The coil 54 further has a midpoint 72. As will be described in greater detail hereinbelow, the first coil end 68, the second coil end 70 and the midpoint 72 are provided so that electrical connection may be made to the coil 54.

Figure 3:
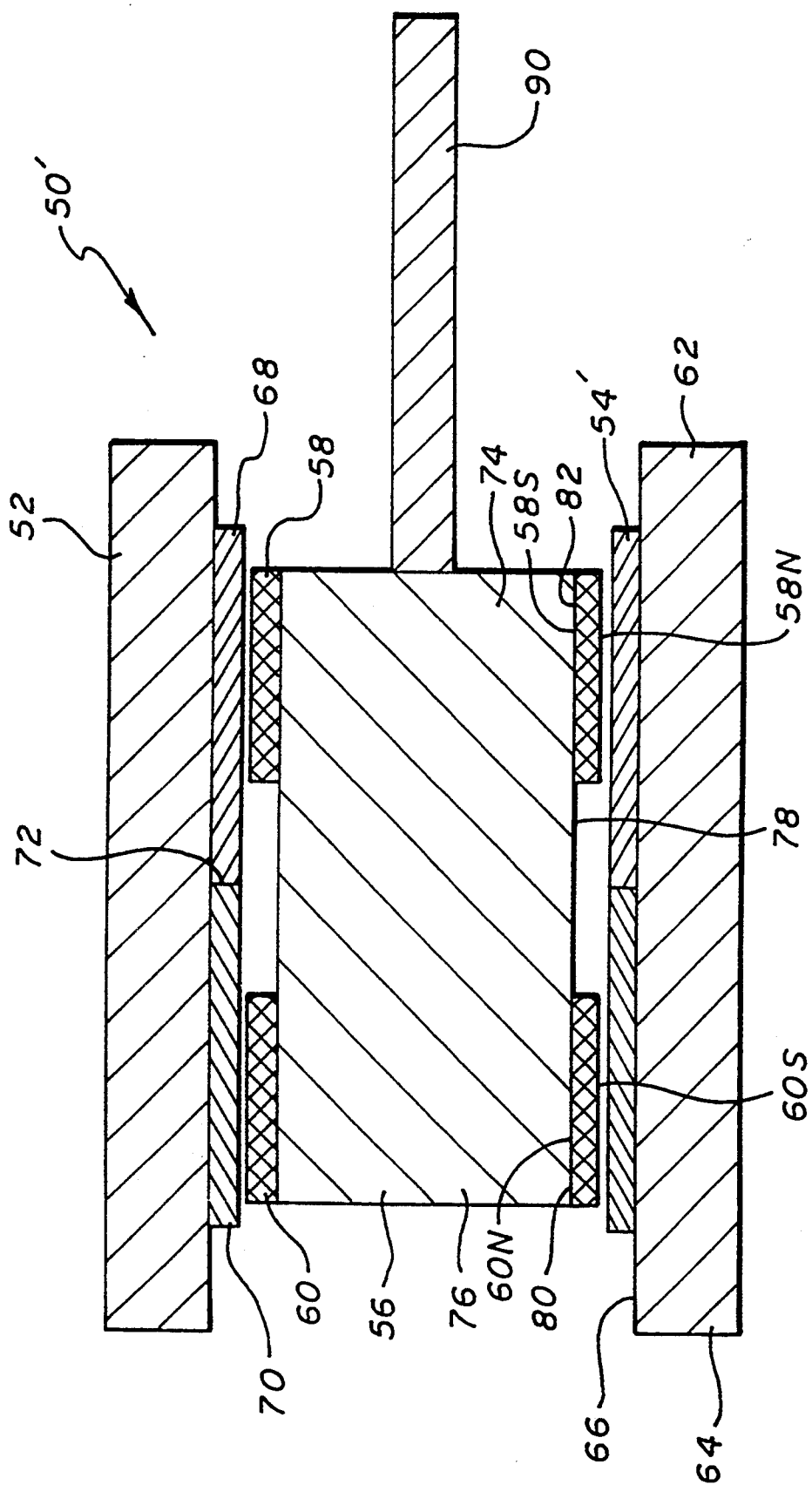
FIG. 3 is a cross-sectional view of an alternate embodiment of the electromagnetic actuator of FIG. 2.

In the embodiments of the actuator shown in FIGS. 2 and 3, the core 56 is a cylinder of magnetic flux conductive material. The core 56 has a first core end 74, a second core end 76, and a cylindrical exterior wall 78 extending between the first core end 74 and the second core end 76. The exterior wall 78 has a first region 80 adjacent the first core end 74 and a second region 82 adjacent the second core end 76.

The core 56 is coaxially received in the chamber of the case 52 and mounted therein in axially slideable engagement. Accordingly, the cylindrical exterior wall 78 of the core 56 is radially spaced from the coil 54. Motion of the core 56 occurs between the first case end 62 and the second case end 64 such that the first region 80 traverses the coil 54 in the axial direction between the first coil end 68 and the midpoint 72, and the second region 82 axially traverses the coil 54 between the second coil end 70 and the midpoint 72.

Figure 4:
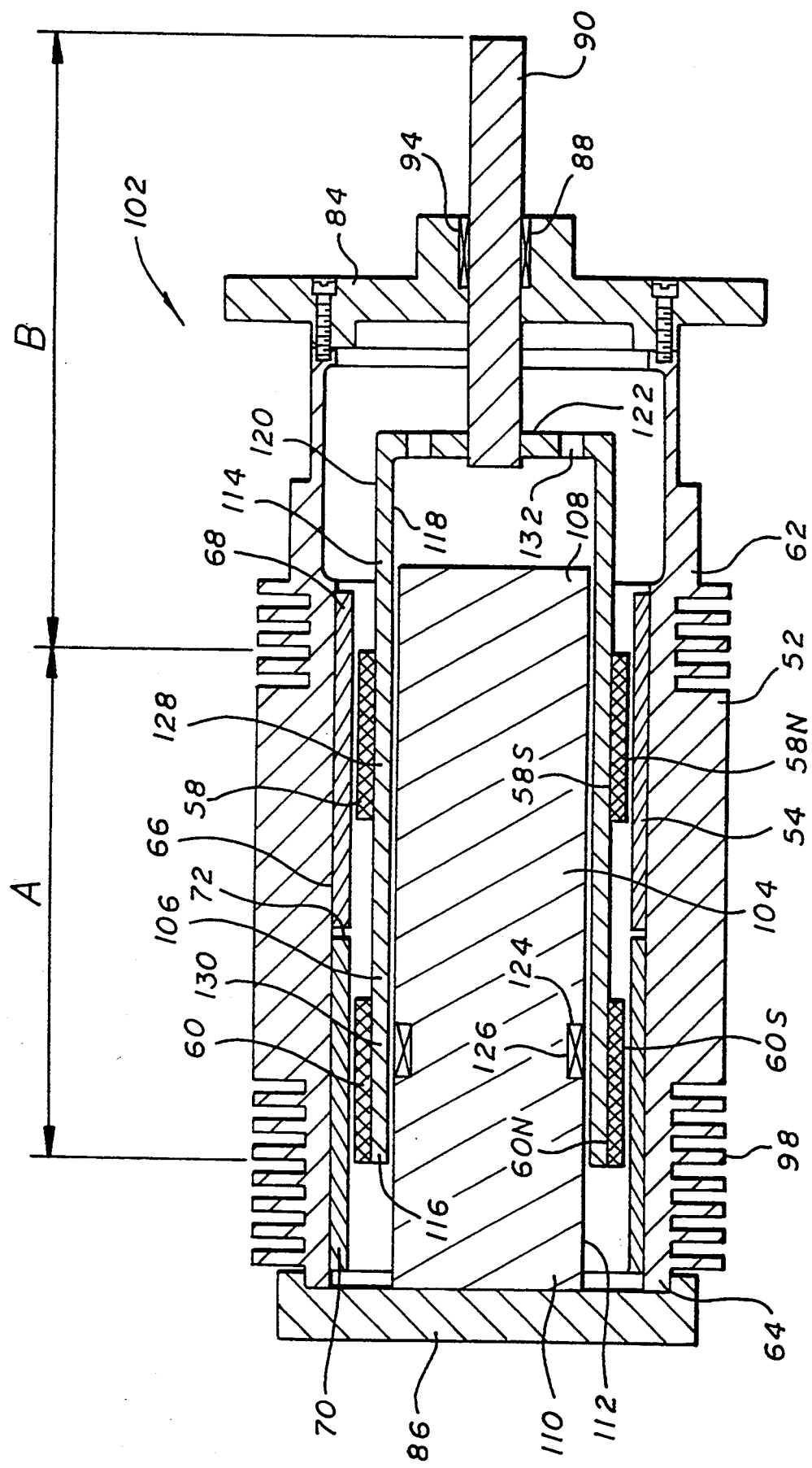
FIG. 4 is a cross-sectional view of an alternate embodiment of the low mass electromagnetic actuator of the present invention.

Referring now to FIG. 4, a low mass embodiment 102 of the electromagnetic actuator is shown. In the low mass embodiment, the core 56 (previously described with reference to FIGS. 2 and 3) is comprised of two portions, a first stationary core portion 104 and a second slideable core or sleeve portion 106. Both the stationary core portion 104 and the slideable core portion 106 are disposed within the chamber 100, and extend coaxially within the chamber 100.

In the embodiment shown in FIG. 4, the first stationary core portion 104 is a solid cylinder having a first end 108, a second end 110, and an exterior wall 112 extending from the first end 108 to the second end 110. The stationary core portion 104 is comprised of a magnetic flux conductive material, for example, a solid steel material. Therefore, the magnetic flux developed by the magnetic flux developing elements 58, 60 is able to pass through the stationary core portion 104.

The second slideable core portion 106 includes a first end 114, a second end 116, an interior wall 118, and an exterior wall 120, with the interior and exterior walls 118, 120 extending from the first end 114 to the second end 116. The interior wall 118 of the slideable core portion 106 maintains a facing relationship to the stationary core portion exterior wall 112. However, the gap between the slideable core portion interior wall 118 and stationary core portion exterior wall 112 is preferably minimized. Therefore, as shown in FIG. 4, the slideable core portion 106 closely fits over the stationary core portion 104.

The slideable core portion 106 further includes an end wall 122, which encloses the first end 114 of the slideable core portion 106. The slideable core portion 106 also includes a rod 90 extending from the end wall 122. The rod 90 extends externally of the actuator and provides for external connection of an actuated device (not shown) to the slideable core portion 106. It is desirable to minimize the thickness and the weight of the material used in the slideable core portion 106 so that the moving core mass remains relatively small. For example, in the embodiment of the actuator shown in FIG. 4, the portion of the slideable core portion 106 extending from the first magnetic element 58 to the second magnetic element 60 (designated by line A—A on FIG. 4) is preferably comprised of a ferrimagnetic material. The portion of the slideable core portion 106 extending beyond the first magnetic element 58 to the end of the rod 90 (designated by line B—B on FIG. 4) may be comprised of a paramagnetic or a non-magnetic material.

The slideable core portion 106 further includes at least one aperture 132, preferably located at the first end 114 or the end wall 122 of the slideable core portion 106. The apertures 132 serve to release air pressure developed between the slideable core portion 106 and the stationary core portion 104.

In operation of the actuator, the slideable core portion 106 slides in an axial direction along the length of stationary core portion exterior wall 112. In order to reduce friction between the stationary core portion exterior wall 112 and the slideable core portion interior wall 118, the stationary core portion exterior wall 112 may define a channel 124 extending circumferentially around the stationary core portion 104. Bearings 126 may be placed in the channel 124 to further reduce friction between the two core portions. Preferably, the slideable core portion 106 is approximately the same length as the stationary core portion 104.

The advantages of the low mass electromagnetic actuator shown in FIG. 4 are now explained with reference to the following equations. First, the force of the actuator is calculated by the equation:

$$F = m^*a \tag{1}$$

wherein

F = the force of the actuator;
m = the mass of the moving core; and
a = acceleration of the moving core.

The acceleration of the moving core can further be calculated by the following equation:

$$a = -w^2 A \sin(wt) \tag{2}$$

wherein

A = the amplitude of the moving core; and $$w = 2\pi f. \tag{3}$$

f = cycles per second (HZ)

Therefore, substituting the second and third equations into the first equation, the force of the actuator is determined by the equation:

$$F = m^*(2\pi f)^2 A \sin(wt) \tag{4}$$

The fourth equation shows that the amplitude and frequency squared of the actuator are inversely related to the mass of the moving core. Therefore, reducing the mass of the moving core enables the actuator to achieve higher frequency and amplitude while using less energy. Moreover, in most electromagnet actuator applications the frequency and amplitude of the actuator are known required values determined by the specific application for the actuator. The ability to decrease the mass of the moving core by creating the hollow lightweight moving core 106 enables the actuator to achieve the required frequency and amplitude values, while utilizing less energy than an actuator with a solid moving core having a heavier mass. Moreover, the flux developed by the magnetic elements 58, 60 can pass through the solid stationary core portion 104.

In the embodiment shown in FIG. 4, the slideable core portion exterior wall 120 includes a first region 128 adjacent the first end 114 of the slideable core portion 106, and a second region 130 adjacent the second end 116 of the slideable core portion 106. The first magnetic element 58 is preferably carried on the first region 128 of the slideable core portion 106. The second magnetic element 60 is preferably carried on the second region 130 of the slideable core portion 106. The distance between the first magnetic element 58 and the second magnetic element 60 is preferably approximately equal to two times the amplitude of the actuator, which is equivalent to the stroke of the actuator. In the embodiment shown in FIG. 4, the magnetic flux developing elements 58, 60 are carried on the slideable core portion exterior wall 120. However, it should be noted that the magnetic flux developing elements 58, 60 may also be carried on the slideable core portion interior wall 118. In this embodiment, the coil 54 is disposed coextensively adjacent the stationary core portion exterior wall 112. The slideable core portion interior wall 118 and the coil 54 are adequately spaced apart from each other so as to allow sufficient room for the magnetic flux developing elements 58, 60.

In the embodiments shown in FIGS. 2 and 3, the magnetic elements 58, 60 are radially polarized and each have a first pole face 58S, 60S of a first magnetic polarity and a second pole face 58N, 60N of a second magnetic polarity opposite the first polarity. The first magnetic element 58 is carried by the first region 80, with its first pole face 58S being adjacent the first region 80 and its second pole face 58N being radially distal from the first region in a spaced relationship to the coil 54. Similarly, the second magnetic element 60 is carried by the second region 82. The first pole face 60S of the second magnetic element 60 is radially distal from the second region 82 in a spaced relationship to the coil 54 and its second pole face 60N is adjacent the second region 82.

In the embodiment of the invention shown in FIG. 4, the magnetic elements 58, 60 are also preferably radially polarized, with the first pole face 58S, 60S of a first magnetic polarity, and the second pole face 58N, 60N of a second polarity opposite the first polarity. The first magnetic element 58 is preferably carried by the first region 128 of the sliding core portion 106, with its first pole face adjacent the first region 128, and its second pole face 58N being radially distal from the first region 128, and preferably in a spaced relationship to the coil 54. Similarly, the second magnetic element 60 is preferably carried by the second region 130 of the sliding core portion 106, with the first pole face 60S of the second magnetic element 60 being radial distal from the second region 130, and preferably in a spaced relationship to the coil 54, and the second pole face 60N being adjacent the second region 130.

Accordingly, the magnetic flux developed by the magnetic flux developing elements 58, 60 is radially confined between the first region 80 (shown in FIG. 3) or 128 (shown in FIG. 4) and the axial section of the interior wall 66 facing the first region 80 or 128 and further confined between the second region 82 (shown in FIG. 3) or 130 (shown in FIG. 4) and the axial section of the interior wall 66 facing the second region 82 or 130. Furthermore, since the first magnetic element 58 is of reverse polarity to the second magnetic element 60, the radial flux between the first region 80 or 128 and the interior wall 66 will be in the first direction and the radial flux between the second region 82 or 130 and the interior wall 66 will be in the second opposite radial direction. Since magnetic flux will follow the path of lowest reluctance, the axially directed flux will occur in the core 56, or stationary core portion 104, between the first region 80 or 128 and the second region 82 or 130 and in the housing 52 in an axial portion where the core 56, or stationary core portion 104 is present. For similar reasons, the flux emanating radially from the pole face 58N or the pole face 60S will not tend to fringe in an axial direction within the chamber of the housing 52.

The coil is preferably arranged so that an electrical current in the coil between the first coil end 68 and the midpoint 72 flows in an opposite direction with respect to the direction of the current in the coil between the second coil end 70 and the midpoint 72. Accordingly, the flux current cross product of the flux in the first radial direction between the pole face 58N and the current in the coil 54 and the flux current cross product of the flux in the second radial direction from pole face 60S and the current in the coil 54 are additive.

With reference to FIG. 3, a linear actuator 50', which is an alternative embodiment of the linear actuator 50 described with reference to FIG. 2. In the linear actuator 50', the coil 54' is wound in a first direction between its first coil end 68 and the midpoint 72, and counterwound in a second direction between the midpoint 72 and the second coil end 70. Such counterwound coil is described in conjunction with FIG. 6 in the '158 Patent. Accordingly, a current applied to the first coil end 68 with the current return taken from the second coil end 70 will provide for a reverse of a direction of current at the midpoint 72 so that the flux current cross product in the actuator is additive, as described hereinabove. It is to be noted that the counterwound coil of FIG. 3 may also be used in the low mass electromagnetic actuator embodiment 102 shown in FIG. 4 when the pair of magnetic flux developing elements are used.

Each of the magnetic elements 58, 60 are in the abovedescribed embodiment of the present invention radially polarized cylindrical magnets. It is also possible to construct such polarized magnetic elements 58, 60 from a series of rectangular bar magnets disposed edge to edge about either the first region 80 or 128 or second region 82 or 130 to approximate a radially polarized cylindrical magnet. Such construction of bar magnets is described in conjunction with FIG. 3 of the '158 Patent.

In an alternative embodiment, a single magnetic flux developing element may be used. In this alternative embodiment, the magnetic element is mounted to the slideable core portion adjacent the second end 116 of the slideable core portion. In this embodiment, the stationary core portion, the second end cap, and the portion of the housing extending from the second end of the housing to the distal end of the magnetic element is comprised of a magnetic material. The portion of the slideable core portion to which the magnetic element is secured is also comprised of a magnetic element. The remaining portion of both the housing and the slideable core portion is comprised of a non-magnetic material. Accordingly, the flux path travels through the magnetic portion of the housing and the magnetic portion of the slideable core portion. Also in this embodiment, the coil is wound in only one direction.

It may also be desirable to use more than two magnetic flux developing elements in the actuator in order to provide additional force in the axial direction. In this situation, additional magnetic flux developing elements and coil sections may be added, with the resulting magnetic field providing additional force in the axial direction.

In the linear actuators of FIGS. 2, 3 and 4, the construction may further include a first end cap 84 and a second end cap 86. In the low mass electromagnetic actuator embodiment 102 shown in FIG. 4, the stationary core portion 104 is preferably directly attached to the second end cap 86. Each end cap 84, 86 is fabricated from nonmagnetic material. The first end cap 84 attaches to the first end 62 of the housing 52 and the second end cap 86 attaches to the second end 64 of the housing 52, as best seen in either FIG. 2 or FIG. 4. The first end cap 84 has a coaxial bore 88. The rod 90, fabricated from nonmagnetic material, is received in axial slideable engagement within the bore 88 and attaches to the first end 74 of the core 56, or, as shown in FIG. 4, to the end wall 122 at the first end 114 of the slideable core portion 106. The rod provides for external connection of an actuated device (not shown) to the moving core 56, or slideable core portion 106. The bore 88 may include linear bearings or bushings as is well known in the art.

There has been described hereinabove an exemplary preferred embodiment of the linear actuator according to the principles of the present invention. Those skilled in the art may now make numerous uses of, and departures from, the above-described embodiments without departing from the inventive concepts disclosed herein. Accordingly, the present invention is to be defined solely by the scope of the following claims.

We claim as our invention:

1. In an electromagnetic actuator including a magnetic material cylindrical hollow housing defining a chamber coaxial with said housing, an electrical current coil disposed within said chamber, a magnetic material core disposed within said chamber, and at least one magnetic element being carried by said core, an improvement comprising:
said core further including a stationary core portion and a moveable core portion, said moveable core portion being disposed intermediate said coil and said stationary core portion, wherein said magnetic elements are carried on an exterior wall of said moveable core portion.

2. An improvement in an electromagnetic actuator in accordance with claim 1 wherein said stationary core portion further includes at least one channel disposed between said stationary core portion and said moveable core portion.

3. An improvement in an electromagnetic actuator in accordance with claim 2 further including a bearing disposed in each of said channels to reduce friction between the core portions.

4. An improvement in an electromagnetic actuator in accordance with claim 1 wherein a portion of said moveable core portion is comprised of a paramagnetic material.

5. A low mass electromagnetic actuator comprising:
   a housing, said housing being comprised of a magnetic material;
   an electrical current coil disposed within said housing, said coil engaging said housing;
   a stationary core portion disposed within said housing and said coil, said stationary core portion being comprised of a magnetic material;
   a slideable core portion disposed intermediate said stationary core portion and said coil, said slideable core portion being in slideable relation to said stationary core portion; and
   at least one magnetic element carried on an exterior wall of said slideable core portion, said magnetic element being in a facing relationship to said coil.

6. A low mass electromagnetic actuator in accordance with claim 5 wherein said slideable core portion includes a rod extending from a first end of said slideable core portion.

7. A low mass electromagnetic actuator in accordance with claim 5 wherein said coil includes a coil first end, a coil second end, and a midpoint, and further wherein said coil is wound in one direction from the coil first end to the midpoint, and wound in the opposite direction from the midpoint to the coil second end.

8. A low mass electromagnetic actuator in accordance with claim 7 wherein said magnetic element is comprised of a first magnetic element and a second magnetic element, wherein said first electromagnetic element is secured to said slideable core portion in a first region of said slideable core portion and said second magnetic element is secured to said slideable core portion in a second region of said slideable core portion such that magnetic flux across the coil between the slideable core portion first region and the housing is in a first direction, and magnetic flux across the coil between the slideable core portion second region and the housing is in a second direction opposite the first direction, said coil being arranged so that an electrical current in said coil between said coil first end and said coil midpoint flows in an opposite direction with respect to current in the coil between said coil second end and said coil midpoint, and further wherein the flux cross product of the flux in said first direction with the current and the flux current cross product of the flux in said second direction with the current are additive.

9. A low mass electromagnetic actuator in accordance with claim 5 further comprising an end bell fabricated from a non-magnetic material, said end bell being disposed adjacent a second end of said housing.

10. A low mass electromagnetic actuator in accordance with claim 8 wherein said stationary core portion is secured to said end bell.

11. A low mass electromagnetic actuator in accordance with claim 5 wherein said actuator further comprises a front bell, said front bell being fabricated from a non-magnetic material, and being adjacent a first end of said housing.

12. A low mass electromagnetic actuator in accordance with claim 5 wherein said stationary core portion further defines at least one channel, said channel being intermediate said stationary core portion and said slideable core portion.

13. A low mass electromagnetic actuator in accordance with claim 12 further comprising a bearing disposed within each of said channels to reduce friction between said stationary core portion and said slideable core portion.

14. A low mass electromagnetic actuator comprising:
   a cylindrical housing, said housing defining a coaxial chamber within said housing;
   an electrical current coil disposed within said chamber such that said coil is coaxial with said chamber;
   a magnetic material first core portion, said first core portion also disposed within said chamber and being coaxial with said chamber such that said coil is intermediate said housing and said first core portion;
   a second core sleeve portion disposed intermediate said first core portion and said coil, said second core portion being coaxial with said first core portion and being in an axial slideable relationship with said first core portion; and
   at least one magnetic element carded on an exterior wall of said second core portion, wherein said magnetic element is in a facing relationship with said coil.

15. A low mass electromagnetic actuator in accordance with claim 14 wherein a portion of said second core portion is comprised of a paramagnetic material.

16. A low mass electromagnetic actuator in accordance with claim 14 further including at least one bearing disposed between said first core portion and said second core portion to reduce friction between the first core portion and the second core portion.

17. A low mass electromagnetic actuator in accordance with claim 14 further comprising a front bell fabricated from a non-magnetic material, said front bell being disposed adjacent a first end of said housing.

18. A low mass electromagnetic actuator in accordance with claim 14 further comprising an end bell fabricated from a non-magnetic material, said end bell being disposed adjacent a second end of said housing.

19. A low mass electromagnetic actuator in accordance with claim 18 wherein said first core portion is secured to said end bell.

20. A low mass electromagnetic actuator in accordance with claim 7 wherein said magnetic element is comprised of a first magnetic element and a second magnetic element, wherein said first electromagnetic element is secured to said second core portion in a first region of said second core portion and said second magnetic element is secured to said second core portion in a second region of said second core portion such that magnetic flux across the coil between the second core portion first region and the housing is in a first direction, and magnetic flux across the coil between the second core portion second region and the housing is in a second direction opposite the first direction, said coil being arranged so that an electrical current in said coil between a first end of said coil and a midpoint of said coil flows in an opposite direction with respect to the direction of current in the coil between a second end of said coil and said coil midpoint, and further wherein the flux cross product of the flux in said first direction with the current and the flux current cross product of the flux in said second direction with the current are additive.

* * * * *